(12) United States Patent
Nakagawa et al.

(10) Patent No.: US 7,322,648 B2
(45) Date of Patent: Jan. 29, 2008

(54) CHILD SEAT

(75) Inventors: Osamu Nakagawa, Tokyo (JP);
Masayuki Sakumoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/524,330

(22) Filed: Sep. 21, 2006

(65) Prior Publication Data
US 2007/0080568 A1 Apr. 12, 2007

(30) Foreign Application Priority Data
Oct. 7, 2005 (JP) ............................. 2005-295141

(51) Int. Cl.
*B60N 2/28* (2006.01)
(52) U.S. Cl. ................ 297/250.1; 297/183.3; 297/253; 297/254
(58) Field of Classification Search ............ 297/183.3, 297/183.4, 250.1, 253, 256.15, 483, 484, 297/254
See application file for complete search history.

(56) References Cited

U.S. PATENT DOCUMENTS

| | | | | |
|---|---|---|---|---|
| 4,591,208 A | * | 5/1986 | McDonald et al. ......... | 297/487 |
| 4,687,255 A | * | 8/1987 | Klanner et al. ............. | 297/488 |
| 5,695,243 A | * | 12/1997 | Anthony et al. ......... | 297/250.1 |
| 5,842,737 A | * | 12/1998 | Goor ..................... | 297/216.11 |
| 5,988,743 A | * | 11/1999 | Drexler .................. | 297/250.1 |
| 6,378,937 B1 | * | 4/2002 | Faudman ................. | 297/183.1 |
| 6,450,576 B1 | * | 9/2002 | Rhein et al. ............. | 297/250.1 |
| 6,736,456 B2 | | 5/2004 | Okamoto et al. | |
| 2005/0121956 A1 | * | 6/2005 | Dolan et al. ................ | 297/253 |
| 2006/0244292 A1 | * | 11/2006 | Bijl et al. ................ | 297/250.1 |

FOREIGN PATENT DOCUMENTS

JP 2004-106668 4/2004

* cited by examiner

*Primary Examiner*—Peter R. Brown
(74) *Attorney, Agent, or Firm*—Manabu Kanesaka

(57) ABSTRACT

A child seat is constructed such that when the child seat is set facing the rear of the car on a car seat, the child seat is securely fixed on the seat. A handle surrounding the front of a sitting occupant is provided in a seat back portion of the child seat, and a tether extends from the handle. When the child seat is set on a car seat so that it faces the rear of the car, the tether is pulled toward the rear of the car. A hook on the tip portion of the tether is latched onto a tether anchor of the car behind the car seat, and the rear panel and the handle are joined.

10 Claims, 6 Drawing Sheets

CHILD SEAT

BACKGROUND OF THE INVENTION AND RELATED ART STATEMENT

The present invention relates to a child seat to be set on a seat of a car such that a sitting occupant such as an infant faces the rear of the car.

There is an ISO-FIX child seat standardized in the International Organization for Standardization as a child seat to be set in a car (for example, Japanese Unexamined Patent Application Publication No. 2004-106668).

In the ISO-FIX child seat described in the same publication, a child seat is mounted on a seat cushion and the lower portion (base) of the child seat is joined to an anchor bar provided on a car body.

When the speed of a car is suddenly reduced by a head-on collision (including an offset collision) and etc., the inertia of a child seat set on a seat of the car is applied to move the child seat toward the front of the car. When the lower portion of the child seat is bound to the car seat and the speed is suddenly reduced, the upper portion of the child seat moves forward in such a way that the upper portion of the child seat falls toward the front of the car.

In order to prevent such a forward movement of the upper portion of a child seat, it is proposed that the upper portion of a child seat is joined to a car member, seat back, etc., positioned in the rear of the car behind the child seat (for example, Japanese Unexamined Patent Application Publication No. 2003-191780).

In the above-described Japanese Unexamined Patent Application Publication No. 2003-191780, a child seat is set on a car seat to face the front of the car so that the occupant of the child seat may face the front of the car, a tether extended toward the rear of the car from the upper portion of a seat back portion of the child seat is pulled over the seat back of the car seat, and the tether is latched onto a hook provided on the back surface of the seat back of the car seat. Then, the seat back portion of the child seat is fixed so as to be pressed against the seat back of the car seat by making the tether tense.

In this way, even when the speed of the car is suddenly reduced by a head-on collision, etc., since the upper portion of the child seat is pulled toward the rear of the car by the tether, a circular forward movement of the child seat toward the front of the car is prevented or suppressed.

In the above-described Japanese Unexamined Patent Application Publication No. 2003-191780, a child seat is set to face the front of a car on a car seat and the seat back portion of the child seat is in contact with the seat back of the car seat, and accordingly, a tether joining these portions is relatively short.

On the contrary, when a child seat is set to face the rear of the car so that the occupant of the child seat may face the rear of the car, since the seat base portion of the child seat is disposed between the seat back portion of the child seat and the seat back of the car seat, they are separated widely. Accordingly, it is necessary to make a tether long for joining the seat back portion of the child seat and the seat back of the car seat. However, when the tether is long, the tether can easily become loose.

It is an object of the present invention to provide a child seat constructed in such a way that, when the child seat is set to face the rear of the car on a car seat, the child seat is capable of being securely fixed on the car seat.

SUMMARY OF THE INVENTION

A child seat in a first aspect of the present invention comprises a seat base portion for the buttocks of a sitting occupant placed thereon; and a seat back portion standing from the seat portion, wherein a handle surrounding the front of the sitting occupant is provided, and when the child seat is set on a car seat so that the sitting occupant may face the rear of the car, a tether for joining the handle and a car member situated in the rear of the car behind the car seat is provided.

A child seat in a second aspect comprises a seat base portion for the buttocks of a sitting occupant placed thereon; and a seat back portion standing from the seat base portion, wherein a handle surrounding the front of the sitting occupant is provided and a tether connection portion is provided on the handle, and when the child seat is set on a car seat so that the sitting occupant may face the rear of the car, a tether for joining the handle and a car member situated in the rear of the car behind the seat can be connected to the tether connection portion.

In the child seat of a third aspect, according to the first or second aspect, an ISO-FIX latch member to be latched onto an anchor in a car is provided in the lower portion of the child seat.

In the child seat of the first aspect, when the child seat is set on a car seat so that a sitting occupant may face in the direction of the rear of the car, the handle provided so as to surround the front side of the sitting occupant (in front of the sitting occupant and facing the rear of the car when set in a car) and the body member situated in the rear of the car behind the seat are joined by the tether. Thus, even if the speed of the car is suddenly reduced by a head-on collision, etc., since the child seat is pulled toward the rear of the car by the tether connected to the handle, a circular forward movement of the child seat toward the front of the car is prevented or suppressed.

In the child seat of the first aspect, when the child seat is set on a car seat so that it faces the rear of the car, the handle positioned in front of the sitting occupant, that is, in the rear of the car in front of the seat back portion of the child seat, and the body member are joined by the tether. Also, the tether can be made shorter compared with the case where the seat back portion of the child seat and the body member are directly joined by the tether. In this way, the tether does not easily become loose, and it is possible to securely fix the child seat on a car seat.

In the child seat of the second aspect, when the child seat is set on a car seat so that a sitting occupant may face the rear of the car, the tether for joining the child seat and the body member situated in the rear of the car behind the seat is connected to the tether connection portion of the handle provided so as to surround the front (in front of the sitting occupant and facing the rear of the car when set in a car) of the sitting occupant. In this way, even if the speed of a car is suddenly reduced by a head-on collision, etc., since the child seat is pulled toward the rear of the car by the tether connected to the handle, a circular forward movement of the child seat toward the front of the car is prevented or suppressed.

In the child seat of the second aspect, when the child seat is set on a car seat facing the rear of the car, since the handle positioned in front of the sitting occupant, that is, in the rear of the car behind the seat back portion of the child seat, and the body member are joined by the tether, the tether can be made shorter compared with the case where the seat back portion of the child seat and the body member are directly joined by a tether. In this way, the tether does not easily become loose and it is possible to securely fix the child seat on a car seat.

In the child seat of the third aspect, since an ISO-FIX latch member to be latched onto an anchor in a car is provided in the lower portion of the child seat, it is possible to securely fix the lower portion of the child seat to a car seat and also it is possible to make the lower part of the child seat easily detachable from and attachable to the car seat.

DETAILED DESCRIPTION OF PREFERRED EMBODIMENTS

Hereinafter, the embodiments of the present invention are described with reference to the drawings.

Figure 1:
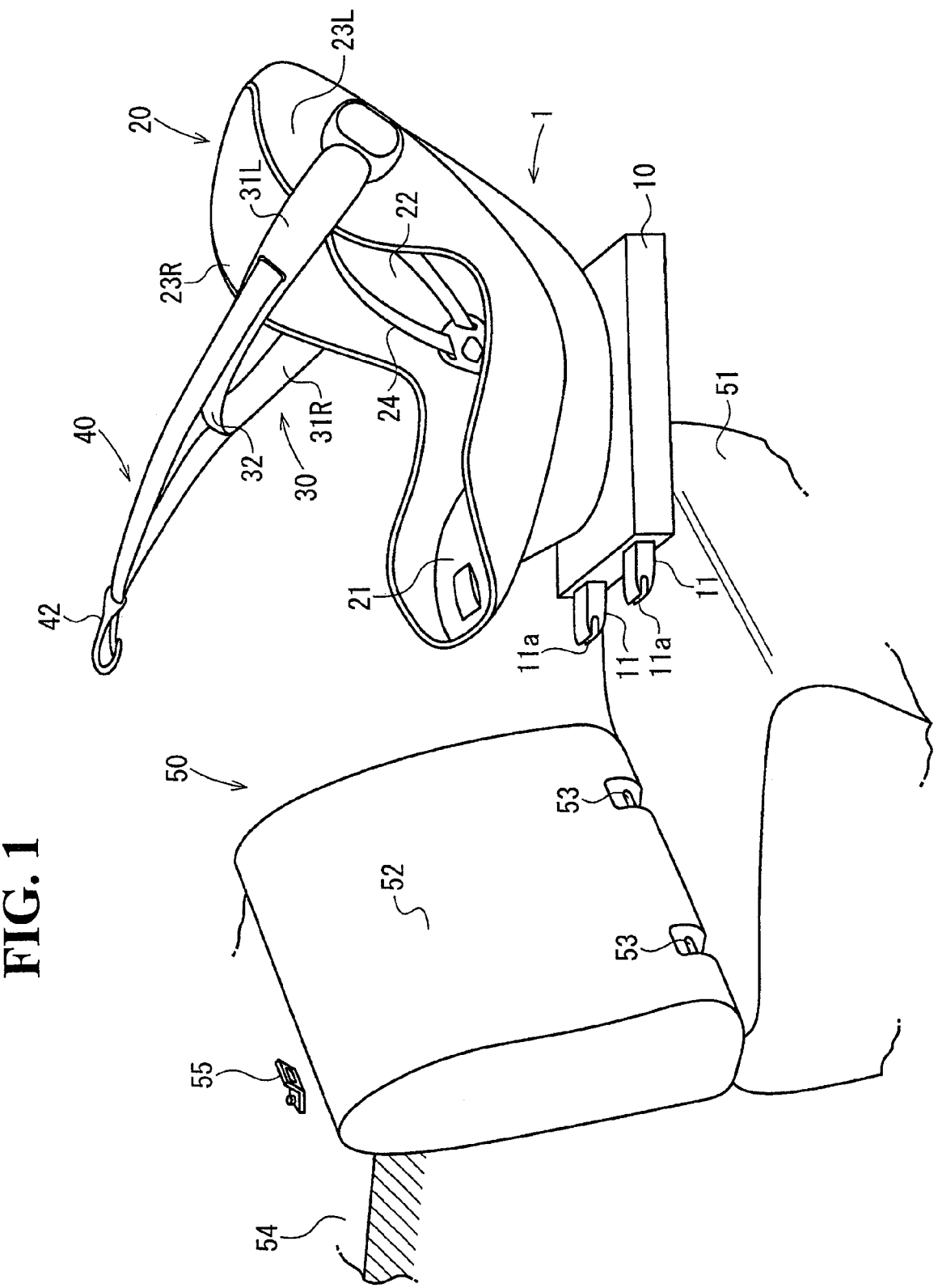
FIG. 1 is a perspective view of the vicinity of a child seat according to an embodiment and a car seat.
Figure 2:
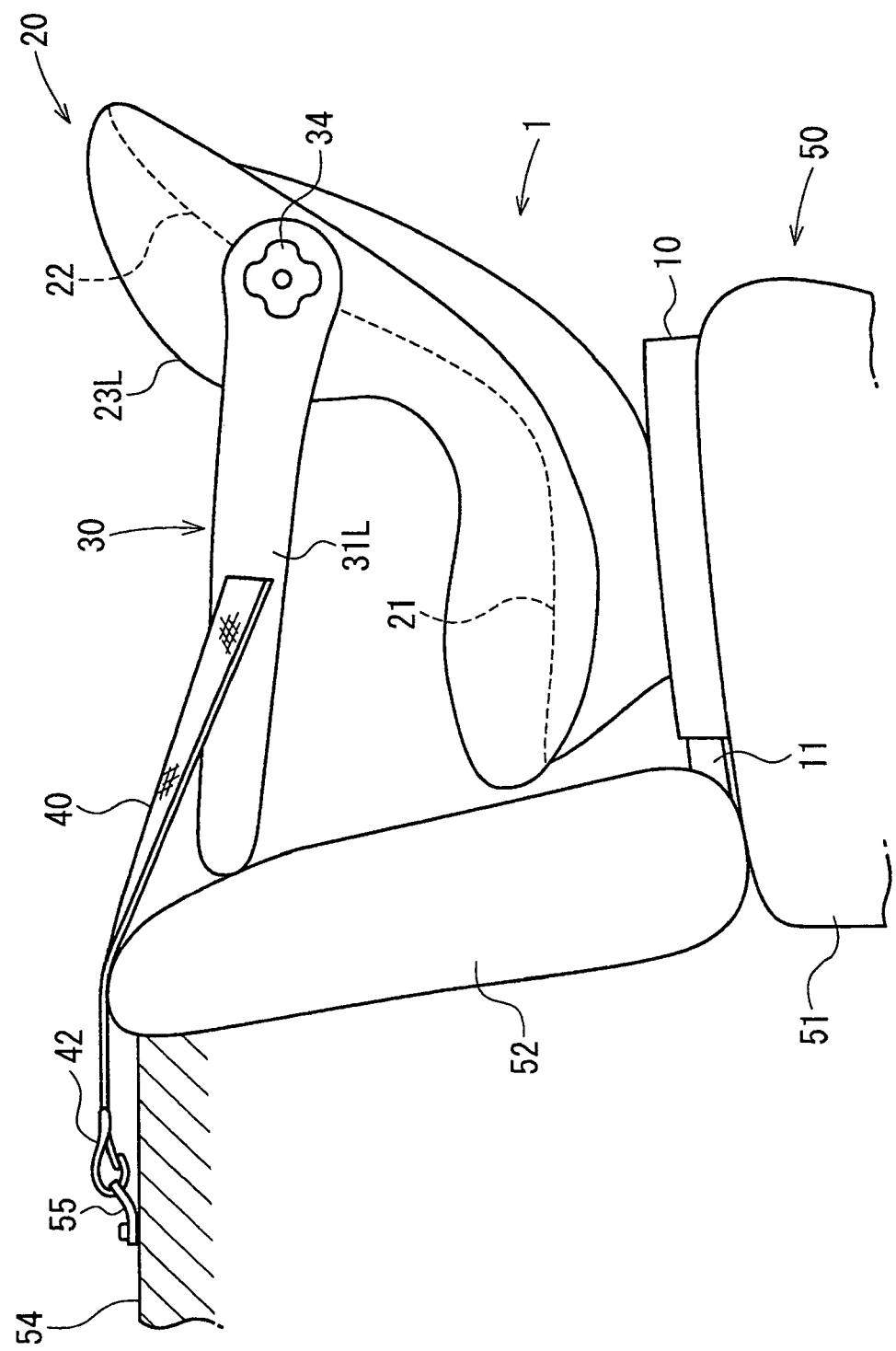
FIG. 2 is a side view showing the state in which the child seat is set on the car seat.
Figure 3:
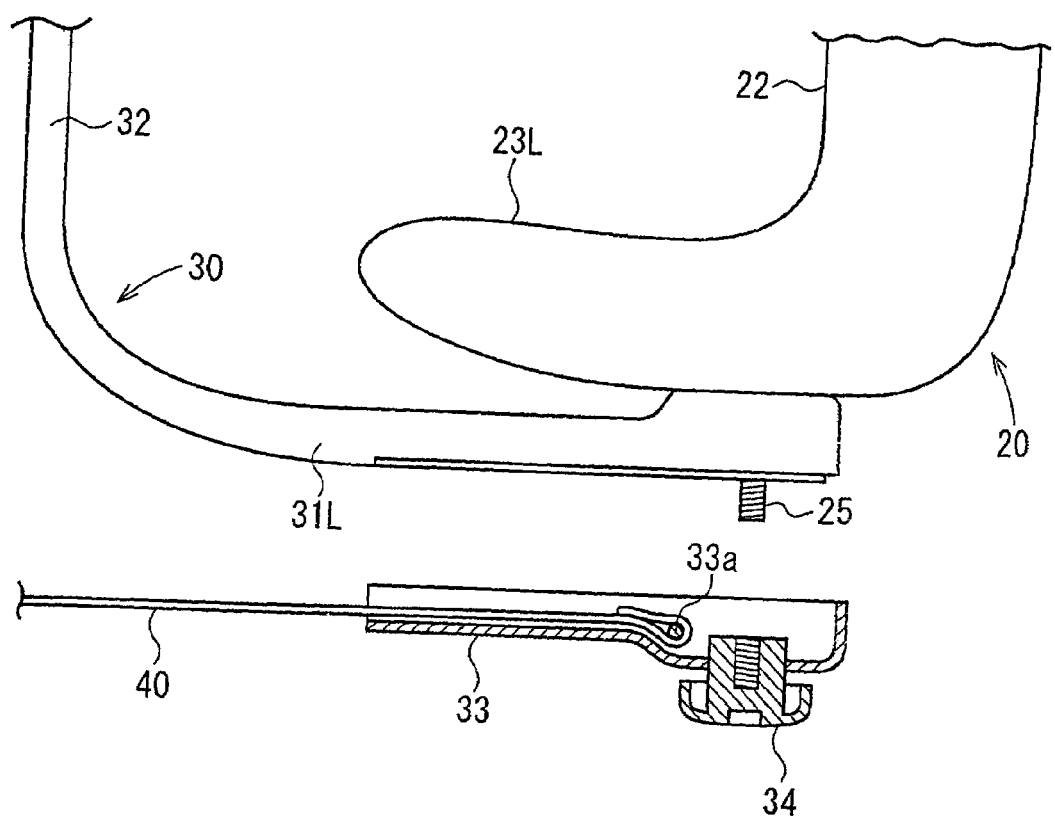
FIGS. 3(a) and 3(b) show the joining structure between a handle and a tether.
Figure 3:
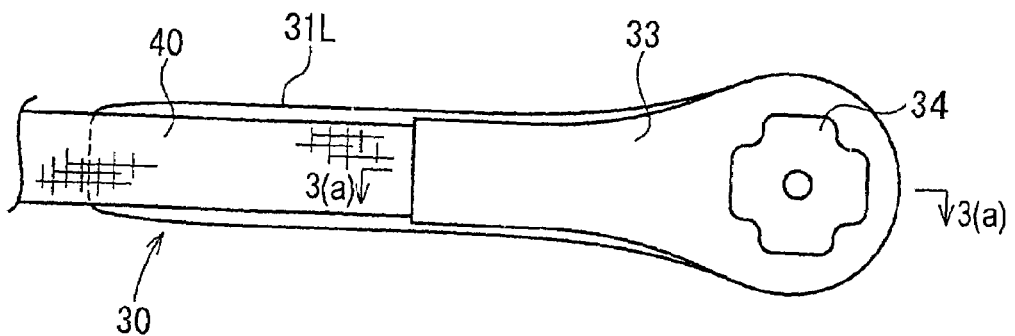
Figure 4:
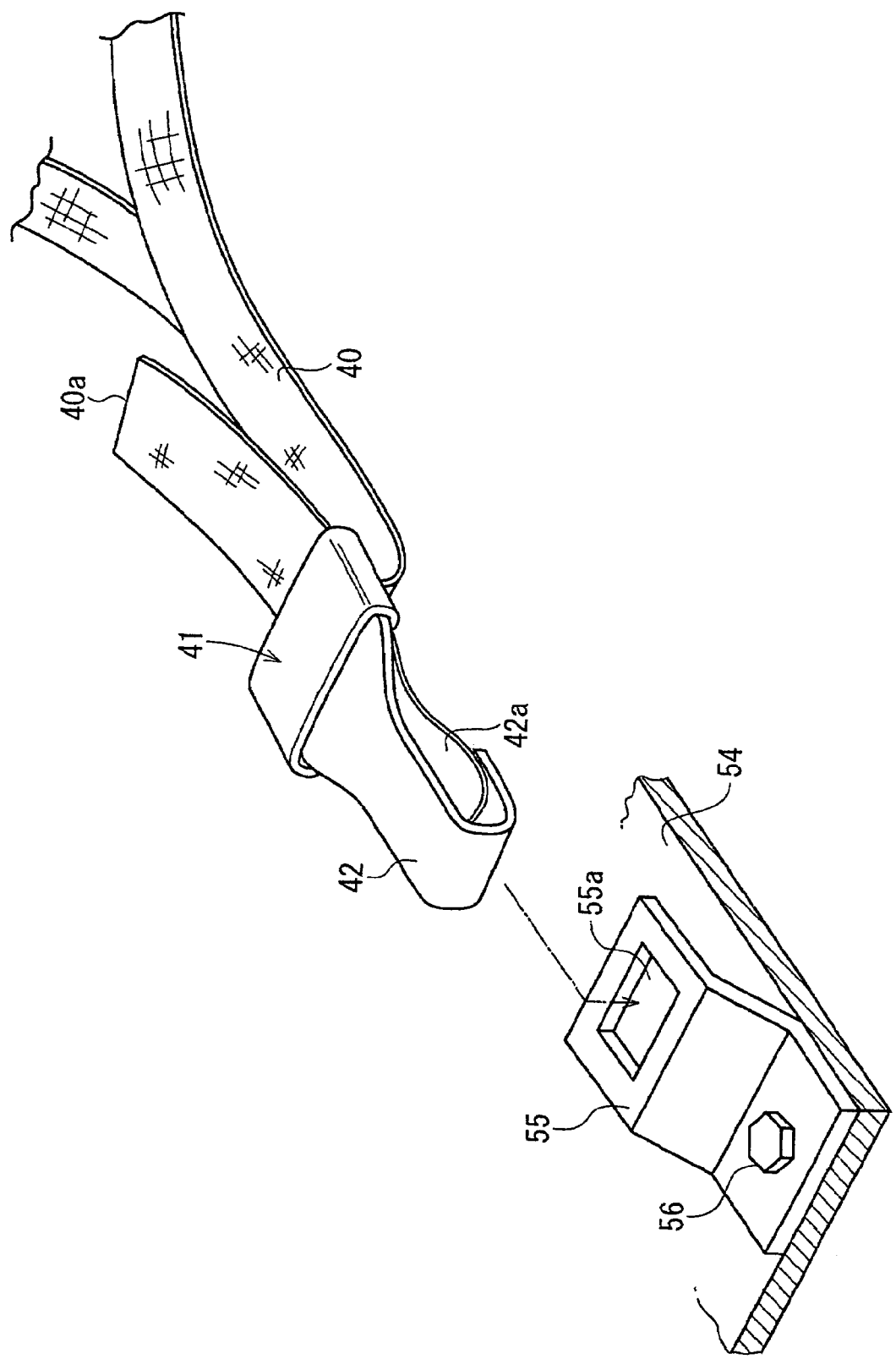
FIG. 4 is a perspective view showing the joining structure between a tether and a rear panel.

FIG. 1 is a perspective view of the vicinity of a child seat according to an embodiment and of a car seat, FIG. 2 is a side view showing the state of the child seat set on the car seat, FIG. 3(a) is an exploded view (top view) showing the joining structure between a handle and a tether of the child seat, FIG. 3(b) is a side view of the handle, and FIG. 4 is a perspective view showing the joining structure between the tether and a rear panel (tether anchor) of a car body. Moreover, in FIG. 3(a), a tether fixing member to be attached on a side face of the handle is shown as a view taken along line 3(a)-3(a) of FIG. 3(b).

In the following description, when the front and the back are used simply, the front and the back of a sitting occupant on the child seat are represented. When the front of the car and the rear of the car are used, the front and the back of a car are represented while the child seat is set on a seat of the car.

In the present embodiment, a child seat 1 is set on a back seat (hereinafter, simply referred to as a car seat) 50 of a car.

The car seat 50 contains a seat cushion 51 and a seat back 52. An ISO-FIX child seat latching anchor (hereinafter, referred to as an ISO-FIX anchor) 53 is provided in the vicinity of the lower portion of the back seat 52 close to the seat cushion 51. Two of the ISO-FIX anchors 53 are provided with a fixed space therebetween on the lower portion of the seat back 52 of the car seat 50.

To the rear of the seat back 52, a rear panel 54 of the car body is set so as to be substantially horizontal. On the upper surface of the rear panel 54, a tether anchor 55 to which a tether to be described later is connected is provided. Reference numeral 56 in FIG. 4 shows a bolt by which the tether anchor 55 is mounted on the rear panel 54, and reference numeral 55a represents a hook latching hole provided in the tether anchor 55.

The child seat 1 includes a base 10 to be placed and held on the seat cushion 51, a child seat main body 20 joined to the base 10, a handle 30 provided in the child seat main body 20, and a tether 40 joining the handle 30 and the rear panel 54 (tether anchor 55).

In the base 10, arms 11 having the ISO-FIX joining mechanisms 11a on their tips (hereinafter, the arms may be referred to as ISO-FIX arms) as latching members to the ISO-FIX anchor 53 are provided. The ISO-FIX arms 11 extend in the direction of the rear of the car from both left and right areas of the side of the base 10 facing the rear of the car when set on the car seat 50.

Moreover, in the base 10, a release lever (not illustrated) for releasing each arm 11 from each anchor 53 and an operation portion (not illustrated) for performing attachment to and detachment from the base 10 of the child seat main body 20 are provided.

In the present embodiment, the child seat main body 20 is joined to the base 10 so as to face the rear of the car when the child seat main body 20 is set on the car seat 50. Thus, a sitting occupant such as an infant seated in the child seat main body 20 may face the rear of the car.

The child seat main body 20 contains a seat base portion 21 on which the buttocks of a sitting occupant are placed and a seat back portion 22 arranged so as to rise from the seat base portion 21. Sidewalls 23L and 23R are arranged so as to extend around the sides of the sitting occupant from both left and right end portions of the seat base portion 21 and the seat back portion 22. Each of the sidewalls 23L and 23R extends from the upper end of the seat back portion 22 to the vicinity of the front end of the seat base portion 21. Reference numeral 24 represents a harness for strapping the sitting occupant to the child seat main body 20.

In the embodiment, the handle 30 is provided on the seat back portion 22 so as to surround the sitting occupant. That is, the handle 30 contains a pair of forward extension portions 31L and 31R extending toward the front of the sitting occupant from both left and right sides of the seat back portion 22 and a bridging portion 32 acting as a bridge between the tip portions of the forward extension portions 31L and 31R. Moreover, as shown in FIG. 3(a), the connecting portion between the bridging portion 32 and the forward extension portions 31L and 31R is curved and the handle 30 is formed so as to be substantially U-shaped as a whole. (However, in FIG. 3(a), only the forward extension portion 31L and the sidewall 23L at the left of a sitting occupant are illustrated.)

As shown in FIG. 3(a), each base portion of the forward extension portions 31L and 31R is joined to a support axis 25 protruding horizontally from the outer surface of each of the sidewalls 23L and 23R. The tip portion of each support axis 25 protrudes horizontally from the outer surface on the base portion of each of the extension portions 31L and 31R. The tip portion of the support axis 25 constitutes a male screw in which a screw thread is formed.

In the present embodiment, portions of the tether 40 extend toward the front of a sitting occupant from the middle portions of both forward extension portions 31L and 31R in the extension direction and are combined into one so as to form a substantially Y-shaped portion.

Each base portion of the tether 40 (both base portions forming a Y-shaped portion) is mounted in a fixed position to a corresponding one of the forward extension portions 31L and 31R by using a fixing member 33 and a nut 34. In the present embodiment, the fixing member 33 is a cover-like part which covers the outside surface of each of the forward extension portions 31L and 31R from their base portion to the middle portion in their extension direction. A tether-connection anchor (bar) is provided on the base portion of the fixing member 33, and the base portion of the tether 40 is connected to the anchor 33a in such a way that the base portion of the tether 40 is folded back so as to surround the anchor 33a and is joined by stitching.

An opening (no reference numeral) where the tip portion of the support axis 25 is disposed is provided on the base portion of the fixing member 33, and the fixing member 33 is mounted in a fixed position to each of the forward extension portions 31L and 31R in such a way that the nut 34 is fastened to the support axis 25 through the opening.

The tether 40 extends in front of a sitting occupant from the tip portion of the fixing member 33 through the back portion of the fixing member 33.

As shown in FIG. 4, a hook 42 is removably mounted on the tip portion of the tether 40 (the end portion beyond the Y-shaped portion) through an adjuster 41 for adjusting the length of the tether 40 (for making the tether 40 tense). The hook 42 is substantially J-shaped so that the hook 42 may latch onto a hook latch hole 55a of the tether anchor 55. In the present embodiment, a plate spring 42a elastically contacting the tip portion from the base portion of the hook 42 is provided in order to prevent the hook 42 from being separated from the tether anchor 55.

The adjustor 41 is constructed so as to allow shortening of the tether 40 from the hook 42 to the base portion of the tether 40. Namely, the adjuster 41 is relatively moved toward the base portion of the tether 40 integrally with the hook 42 when the tip portion 40a of the tether 40 is pulled toward the base portion of the tether 40.

A method of attaching the child seat 1 constructed in this way to the car seat 50 is described.

First, the base 10 is disposed on the seat cushion 51 of the seat 50, and each ISO-FIX arm 11 is joined to each ISO-FIX anchor 53. Next, the child seat main body 20 is attached to the base 10 so as to face the rear of the car so that a sitting occupant faces the rear of the car. On the other hand, the child seat main body 20 is attached to the base 10 in advance and these may be placed together and held on the seat cushion 51. Next, the tether 40 is pulled toward the rear of the car and the hook 42 is latched onto the tether anchor 55 of the rear panel 54. After that, the length of the tether 40 is shortened by pulling the tip portion 40a of the tether 40 and the tether 40 is made tense.

In this way, as shown in FIG. 2, the child seat 1 is fixed to the seat 50 in a state that the tip portion of the handle 30 extending from the front (toward the rear of the car in the present setting) of a sitting occupant is pressed against the seat back 51 of the car seat 50.

In the child seat 1 set in the car seat 50 in this way, even when the speed of the car is suddenly reduced by a head-on collision, etc., since the base 10 is joined to the ISO-FIT arm 53 of the seat 50, the forward movement of the child seat 1 is prevented or suppressed, and, since the seat back portion 22 of the child seat main body 20 is pulled toward the rear of the car by the tether 40 through the handle 30, the forward movement of the child seat 1 is also prevented or suppressed.

Moreover, in the present embodiment, since the tip portion of the handle 30 is pressed against the seat back 52 of the car seat 50, when the speed of the car is suddenly accelerated by a rear collision, etc., a backward movement of the child seat 1 caused by the collision is also prevented or suppressed.

In the child seat 1, when the child seat main body 20 is set on the seat 50 so that it faces the rear of the car, since the handle 30 positioned in the rear of the car in front of the seat back portion of the child seat is joined to the rear panel 54 by the tether 40, the tether 40 can be shortened in comparison with the case where the seat back portion 22 is directly joined to the rear panel 54. Accordingly, the tether 40 is not likely to become loose and it is possible to securely fix the child seat 1 to the sear 50.

Moreover, when the child seat 1 is removed from the car seat 50, first, the tether 40 is loosened by operation of the adjuster 41 and the hook 42 is removed from the tether anchor 55. Next, the child seat main body 20 is separated from the base 10. At this time, it is possible to carry the child seat main body 20 like a basket by grasping the handle 30. After that, each ISO-FIX arm 11 is released from each ISO-FIX anchor 53 and the base 10 is removed from the car seat 50.

The above-described embodiment is one example of the present invention and the present invention is not limited to the above-described embodiment.

For example, in the above-described embodiment, although the handle 30 and the tether 40 are integrally provided, i.e. the base end portion of the tether 40 is mounted in a fixed position to the handle 30 by using the fixing member 33 and the nut 34, the tether may be made attachable to and detachable from the handle.

Figure 5:
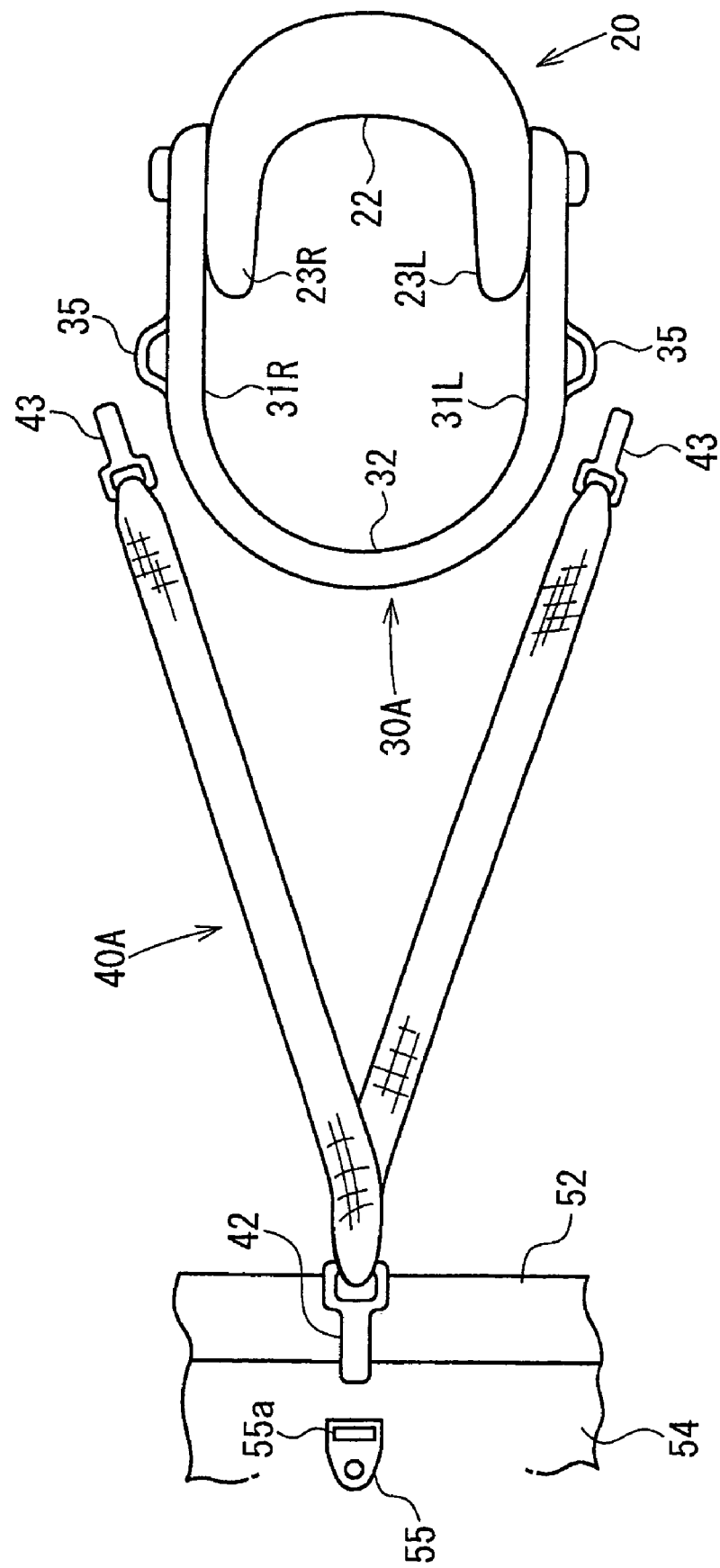
FIG. 5 is a top view showing the joining structure between a handle and a rear panel using a tether according to another embodiment.

FIG. 5 is a top view showing the joining structure between a handle 30A and a rear panel 54 using a tether 40A constituted in the above-described way.

In the embodiment in FIG. 5, a tether anchor 35 as a tether connection portion is provided in the middle portion of each of the forward extension portions 31L and 31R of the handle 30A in the extension direction. Also in the present embodiment, the tether 40A is substantially Y-shaped, and a hook 43 latching onto the tether anchor 35 is removably mounted at the end of each of the Y-shape branched portions. In the tip portion, opposite to the hooks 43, of the tether 40A, i.e. the end portion beyond a part where the branched two portions join, a hook 42 to be latched onto the tether anchor 55 of the rear panel 54 is removably mounted. Moreover, the hooks 42 and 43 may be of the same structure.

The other structure of the present embodiment is the same as that of the embodiment shown in FIGS. 1 to 4.

In the present embodiment, when the child seat 1 is set on the seat 50 so as to face the rear of the car, the hooks 43 on the base portions of the tether 40A are latched onto the tether anchors 35 of the forward extension portions 31L and 31R of the handle 30A, and the hook 42 on the tip portion is latched onto the tether anchor 55 of the rear panel 54, and then the tether 40A is made tense. Thus, in the same way as in the above-described embodiment, the child seat 1 is fixed to the seat 50 in such a way that the tip portion of the handle 30A is pressed against the seat back 51 of the car seat 50.

In the present embodiment, since the tether 40A is made attachable to and detachable from the handle 30A, when the tether 40A is not used (for example, in the case that the child seat main body 20A removed from the seat 50 (or the base 10) is carried, and so on), the tether 40A may be removed and does not become cumbersome.

Figure 6:
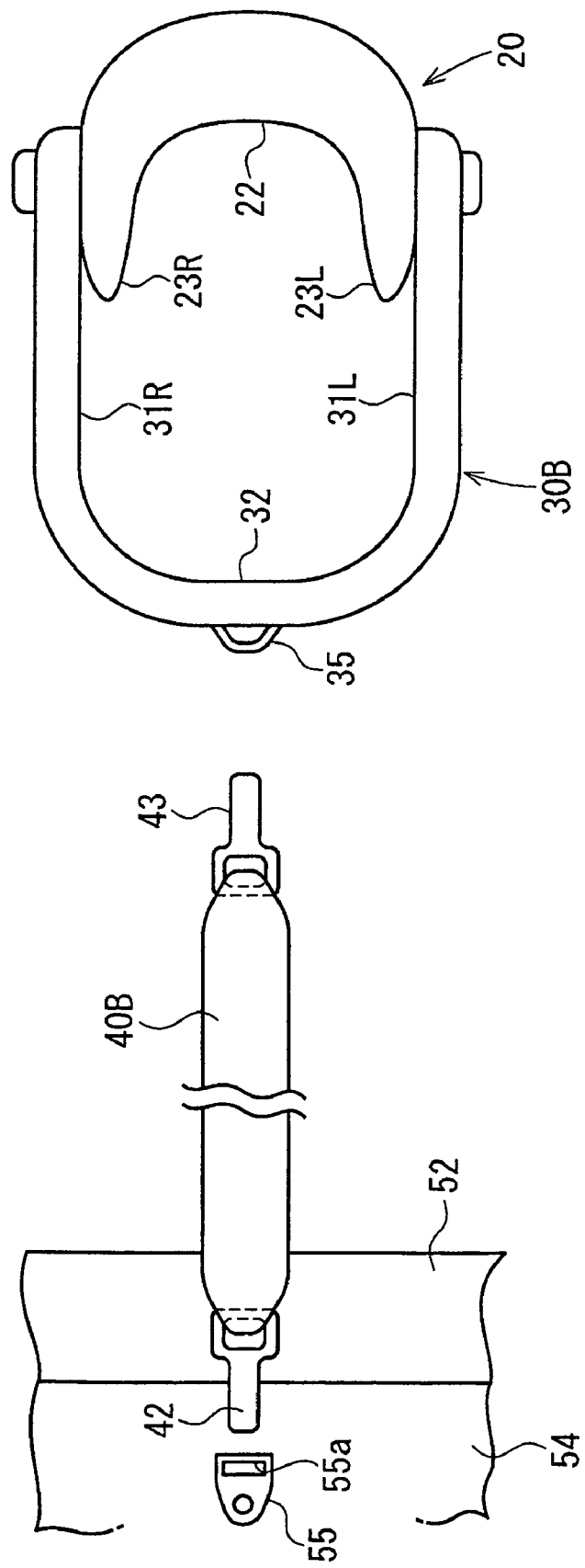
FIG. 6 is a top view showing the joining structure between a handle and a rear panel using a tether according to another further embodiment.

In the above-described embodiments, although the Y-shaped tethers 40 and 40A are used, the structure of the tethers is not limited to these, and, for example, as shown in FIG. 6, a linear tether may be used. FIG. 6 is a top view showing the joining structure between a handle 30B and the rear panel 54 (tether anchor 55) using a tether 40B.

In the embodiment of FIG. 6, the tether 40B is linear, the hook 43 to be latched onto the tether anchor 35 of the handle 30B is removably mounted at one end of the tether 40B, and the hook 42 to be latched onto the tether anchor 55 of the rear panel 54 is removably mounted at the other end. That is, also in the present embodiment, the tether 40B is made attachable to and detachable from the handle 30B. Moreover, in the present embodiment, the tether anchor 35 is provided only in the vicinity of the middle of the bridging portion 32 in the extension direction.

The other structure of the present embodiment is the same as that of the above described embodiments.

As a matter of course, in the present invention, a tether may be made different from linear and y-shaped ones.

In the present invention, the handle and the car member may be joined by using two or more tethers.

In each of the above-described embodiments, although the handle is provided in the seat back portion of the child seat, the handle may be provided in other portions. For example, the handle may be provided in the seat portion of the child seat so that the handle may cross over the seat portion in the left and right direction.

In the present invention, the child seat may be constructed so as to be set not only facing the rear of the car, but also facing the front of the car.

The disclosure of Japanese Patent Application No. 2005-295141 filed on Oct. 7, 2005 is incorporated as a reference.

What is claimed is:

1. A child seat comprising:
   a seat section including a seat base portion for an occupant placed thereon, and a seat back portion rising from the seat base portion,
   a handle attached to the seat section for surrounding a front of the occupant sitting on the seat section, and having at least one tether connection portion, and
   a tether having at least one first portion attached to the at least one tether connection portion of the handle, a second portion adapted to be attached to a car member for joining the handle to the car member, and an adjuster for changing a length of the tether between the at least one first portion and the second portion so that when the seat section is set on the car seat to face rearwardly of a car, the tether joins the seat section and the car member.

2. A child seat according to claim 1, wherein said handle includes two tether connection portions at two sides of the seat section, and said tether includes two first portions at longitudinal ends thereof, said two first portions being detachably attached to the tether connection portions of the handle.

3. A child seat according to claim 2, wherein said first portion includes a hook portion for connecting the tether to the handle.

4. A child seat according to claim 3, wherein said second portion includes a hook located on the tether between the two first portions.

5. A child seat according to claim 4, wherein said at least one tether connection portion is a tether anchor attached to the handle.

6. A child seat according to claim 1, wherein a latch member to be latched onto an anchor in the car is provided in a lower portion of the child seat.

7. A child seat according to claim 1, wherein said at least one tether connection portion is located in a middle of the handle, and said first portion is a hook detachably attached to the at least one tether connection portion in the middle of the handle.

8. A child seat according to claim 7, wherein said at least one tether connection portion is a tether anchor attached to the handle.

9. A child seat comprising:
   a seat section including a seat base portion for an occupant placed thereon, and a seat back portion rising from the seat base portion,
   a handle attached to the seat section for surrounding a front of the occupant sitting on the seat section, and
   a tether attached to the handle for joining the handle to a car member formed at a rear of a car seat so that when the seat section is set on the car seat to face rearwardly of a car, the tether joins the seat section and the car member,
   wherein said handle includes a tether connection portion for connecting the tether to the handle, said tether connection portion being attached to each of two sides of the seat section, together with the handle, and
   wherein said tether connection portion includes a support axis to which the handle and the tether are attached, and a cover for partly covering the handle so that the tether extends between the handle and the cover.

10. A child seat comprising:
    a seat section including a seat base portion for an occupant placed thereon, and a seat back portion rising from the seat base portion,
    a handle attached to the seat section for surrounding a front of the occupant sitting on the seat section, and
    a tether attached to the handle for joining the handle to a car member formed at a rear of a car seat so that when the seat section is set on the car seat to face rearwardly of a car, the tether joins the seat section and the car member,
    wherein said handle includes a tether connection portion for connecting the tether to the handle, said tether connection portion being attached to each of two sides of the seat section, together with the handle, and
    wherein said tether includes two anchor portions attached to the two sides of the seat section, respectively, and one anchor portion adapted to be attached to the car member.

* * * * *